(12) United States Patent
Mead et al.

(10) Patent No.: US 6,646,680 B1
(45) Date of Patent: Nov. 11, 2003

(54) FOCUSING METHOD AND APPARATUS FOR HIGH RESOLUTION DIGITAL CAMERAS

(75) Inventors: Carver A. Mead, Cupertino, CA (US); Richard A. Lyon, Los Altos, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/164,190

(22) Filed: Sep. 30, 1998

(51) Int. Cl.⁷ ............................................. H04N 5/235
(52) U.S. Cl. ............... 348/230.1; 348/320; 348/333.11; 348/345
(58) Field of Search ..................... 348/333.11, 333.12, 348/333.01, 345, 302, 296, 297, 230.1, 320; 250/301; 358/451; 382/205, 220, 264

(56) References Cited

U.S. PATENT DOCUMENTS

| | | | |
|---|---|---|---|
| 4,002,824 A | 1/1977 | Petrocelli et al. | |
| 5,428,390 A | 6/1995 | Cooper et al. | |
| 6,204,879 B1 * | 3/2001 | Koseki et al. | ......... 348/333.11 |

* cited by examiner

*Primary Examiner*—Wendy R. Garber
*Assistant Examiner*—Lin Ye
(74) *Attorney, Agent, or Firm*—Sierra Patent Group, Ltd.

(57) ABSTRACT

A focusing method and apparatus, for use with digital cameras having an electronic viewfinder with less display resolution than in the image generated by the camera's photocell array, uses a uniformly subsampled representation of the entire image for focusing, rather than displaying a selected portion of the higher resolution image. The focusing is assisted by the exaggerated discontinuities produced by subsampling. Introducing flicker enhances focusing sensitivity by repetitively displaying, on the electronic viewfinder, a prescribed set of different reduced-resolution images obtained by subsampling the same high-resolution image at different sampling locations. Each subsampled image of the set of reduced resolution images uses a different set of substantially uniformly distributed pixels.

15 Claims, 8 Drawing Sheets

| A | B | C |
|---|---|---|
| 0.00 | 0.00 | 0. |
| 2.75 | 10.11 | 10. |
| 5.50 | 101.10 | 101. |
| 8.25 | 1000.01 | 1000. |
| 11.00 | 1011.00 | 1011. |
| 13.75 | 1101.11 | 1101. |
| 16.50 | 10000.10 | 10000. |
| 19.25 | 10011.01 | 10011. |
| 22.00 | 10110.00 | 10110. |
| 24.75 | 11000.11 | 11000. |
| 27.50 | 11011.10 | 11011. |
| 30.25 | 11110.01 | 11110. |
| 33.00 | 100001.00 | 100001. |

FOCUSING METHOD AND APPARATUS FOR HIGH RESOLUTION DIGITAL CAMERAS

CROSS REFERENCE TO A RELATED APPLICATION

The present application is related to application Ser. No. 09/120,491, filed Jul., 21, 1998.

BACKGROUND OF THE INVENTION

1. Field of the Invention

The present invention relates to the field of digital electronic cameras and more specifically to a method for focusing by dynamic subsampling of the electronic image when using a reduced resolution electronic display.

2. The Prior Art

All cameras, except the simplest cameras that use small aperture or pin-hole lenses, require focusing of the lens in order to optimize the useable camera-to-subject range for a given lens aperture. As the lens aperture is increased to provide greater light gathering, the depth of field (range over which a subject is acceptably in focus) decreases causing the focus adjustment to be more critical.

A wide lens aperture is also used as a means for emphasizing selected portions of an image by limiting the depth of focus range to include only the selected portion. For this reason, the photographer needs to be able to sharply focus a selected portion of the subject scene so that the portion of interest is within the depth of field for the lens aperture in use.

The lens focusing is normally done while watching the image sharpness directly or through some kind of focusing aid using eye-to-hand feedback control. Conventional film cameras employ a variety of optical focusing aids such as magnifiers and split-image focusing prisms. Digital electronic cameras (hereinafter simply referred to as "digital cameras" can also use the same type of optical viewing and focusing devices. Digital cameras that incorporate an electronic display with a resolution that equals (or exceeds) the full resolution of the electronic image sensor can be focused by directly viewing the image sharpness while adjusting the focus.

The present invention uses a focusing method for digital cameras with electronic viewfinders that have an electronic display, such as a liquid-crystal-display (LCD), with a resolution that is less than the resolution of the internal electronic image sensor array. Image sensor array resolution is usually expressed in terms of the number of "pixels" used to represent the image or, equivalently, the number of photocells in the image sensor array. Because the number of pixels in the image sensor array is greater than the number of pixels that can be displayed, focusing is typically done only on a selected subset of pixels by using a zoom (or magnifier) mode. The zoom mode displays a full resolution image by selecting a subset of contiguous pixels with a pixel count equal to the electronic display capabilities.

The present invention provides a focusing aid and method for use on an electronic display with reduced resolution that allows the photographer to interactively focus on any region of the image while viewing the full image.

BRIEF DESCRIPTION OF THE INVENTION

A dynamic image display method for high-resolution digital cameras, when viewing is done with a reduced-resolution electronic viewfinder display, includes the steps of:

(a) selecting a subset of pixels for producing a reduced resolution image with uniformly reduced horizontal and vertical scales;

(b) displaying the reduced resolution image pixels on a reduced resolution electronic viewfinder display for at least one display frame;

(c) generating a dynamic display by using a different subset of uniformly spaced pixels each time a new lower resolution image frame is displayed; and (d) producing a periodic sequence of such reduced resolution images by cycling through a prescribed set of pixel subsets.

The dynamic focusing method of the present invention produces a periodic display of a set of reduced resolution images that exhibit the effects of spatial frequency aliasing, which provides a useful aid to focusing.

A digital electronic camera is also disclosed that has a live viewfinder to aid in focusing that includes a row and column address generator for subsampling the image sensor pixel array for display in a viewfinder with a lower resolution. The subsampling is accomplished at substantially uniform intervals by a programmable row and a column address generator so that scaling is substantially uniform in the horizontal and vertical directions of the image. The live viewfinder displays a dynamic periodic sequence of different subsampled images of the entire image as an aid to focusing.

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

Digital cameras record an image by placing an electronic image sensor array of N×M photocells at the focal plane of the camera lens. Exposing the photocells to the image captured by the lens creates a picture image as a set of stored charges. The digital camera's associated electronic display accesses the image stored in the photocell array for producing a visual image of the contents of the photocell array.

Thus, the image is stored as a N×M sampled image with each photocell corresponding to a sample of the picture (pixel).

Figure 1A:
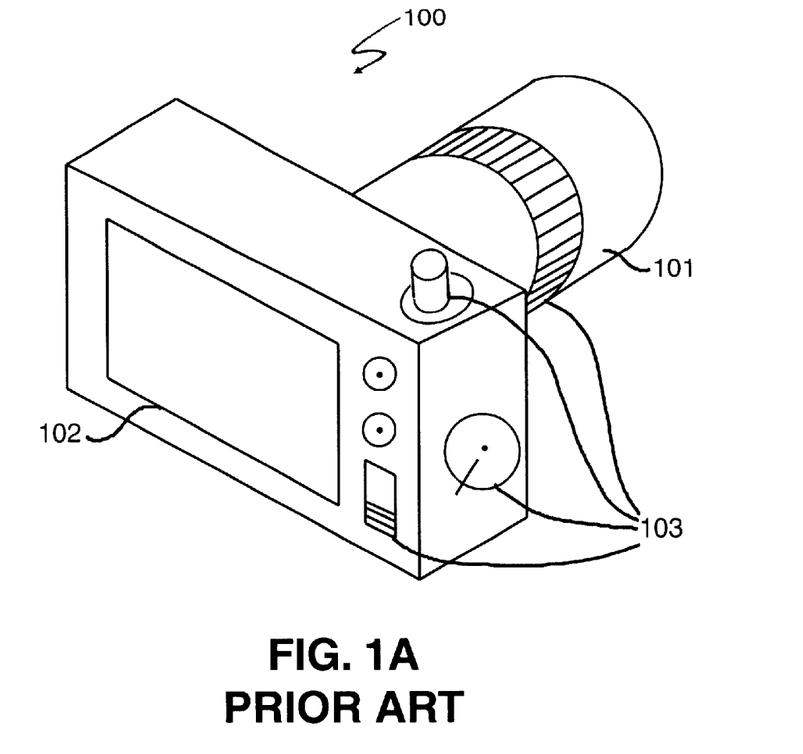
FIG. 1. is a simplified drawing of a digital camera.
Figure 1B:
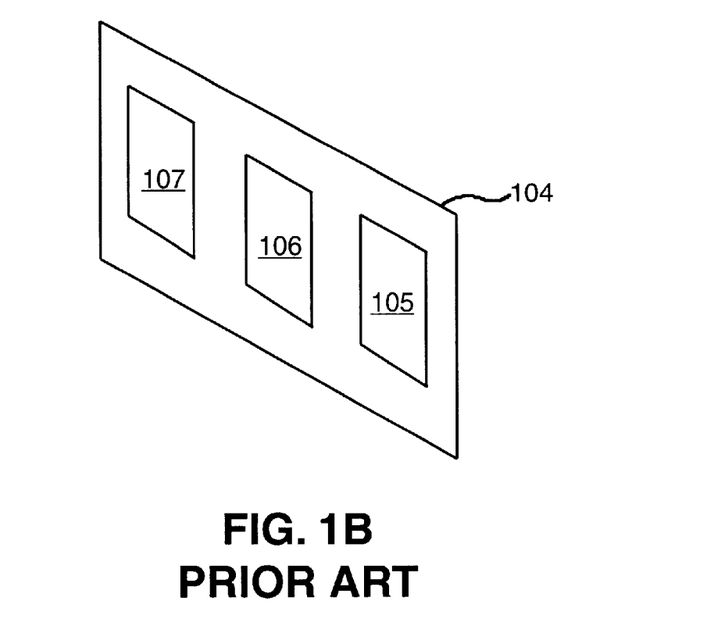

FIGS. 1 (a) and 1(b) are drawings of a prior-art digital camera 100. FIG. 1(a) is an external view that includes a lens assembly 101 for projecting an image of a subject onto a photocell array, an LCD view finder 102 for viewing the image captured by lens assembly 101, and external controls 103 for camera operating mode and shutter control. The external controls 103 are used for controlling the lens and for inputting ancillary parameters (such as exposure mode, compression quality, and aperture size).

FIG. 1(b) shows an electronics assembly 104 that is located at the focal plane of camera 100 and includes control electronics 105, storage subsystem 107, and image sensor module 106. Image sensor module 106 typically has at least one charge-coupled-device (CCD) or photodiode type pixel sensor array for capturing images as arrays of charges which can be read out as voltage signals. Multiple pixel sensor arrays are used for capturing color images after separating the image by means of a set of filters into a set of color component images (such as red, green, and blue). The length of time for which the pixel array is exposed determines the image signal intensity formed in the pixel array. Either a conventional mechanical shutter controls the exposure time or an electronic shutter controls the amount of time from initialization of the array of pixels to the transfer of the pixel charge to a storage or readout circuit.

Because the pixel charge is sensed as an analog voltage, each pixel voltage is converted to a binary quantized signal representative of the charge for storage, read out, or viewing on electronic viewfinder 102 of FIG. 1(a).

If the associated electronic display has a resolution equal to the N×M pixel image stored in the image sensor array (i.e. capable of electronically resolving the N×M pixels on the display screen) then the photographer can interactively focus the image on the display screen by adjusting the focus control of the lens while observing the full resolution image on the display screen. However, if the electronic display can not provide the full N×M resolution of the stored image, it is customary to average adjacent image pixels together to form the value of a representative display pixel. In such a reduced resolution display, the image is blurred so that the sharpness at the photosensor can not be effectively judged by eye.

In order to avoid blurring the image, a smaller number of pixels (N'×M') must be selected for display. The prior-art zoom method selects a pixel array of N'×M' contiguous pixels as a representation of a magnified portion for display. The N'×M' pixel array is chosen to be compatible with the electronic display resolution capability. The focusing operation, performed on the magnified portion, does not allow the photographer to view the effects on the overall image without sequencing through all relevant portions of the image.

As an alternative to the averaging and zooming methods of displaying the N×M image on the reduced resolution N'×M' display, a selection of a subset of uniformly spaced pixels from the original image can be used. This kind of subsampling without averaging is known in the art to cause spatial frequency aliasing, an effect wherein high spatial frequency signal components in the original image are converted to unwanted signal components of lower spatial frequency, or components of larger size scale. These effects of aliasing are often described as "jaggies". The present invention takes advantage of these aliasing artifacts for providing information that is a useful aid to focusing.

A simple focusing method related to the present invention is to adjust the camera to maximize jaggies that result where crisply focused edges in the original image are aliased into staircase-like jaggies. At a particular depth, in any region of the image, the best focus (i.e. maximum sharpness) will correspond to a maximum jaggieness (i.e. maximum amount of local variance or contrast in the display). However, the effect is subtle, and difficult to maximize by eye.

Figure 2:
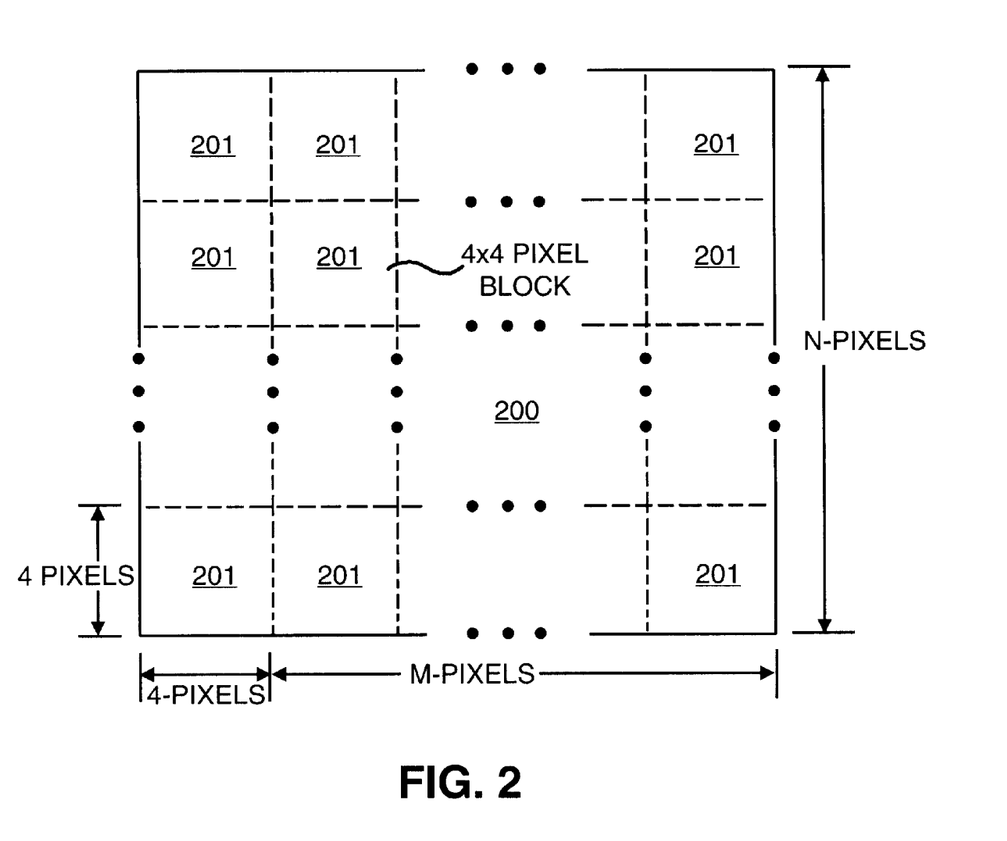
FIG. 2. shows subsampling using contiguous 4×4 pixel blocks for a N×M resolution image.

Subsampling is typically done by taking every $n^{th}$ pixel value from every $n^{th}$ row or, equivalently, by taking a pixel value from one particular location from every contiguous n×n pixel block 201 that makes up the original N×M pixel array 200 as shown in FIG. 2. This also results in the subsampled image having the same horizontal and vertical scale reduction. From the example shown in FIG. 2, for n×n=4×4, it can be seen that there are $n^2=16$ choices of which pixel to choose as representative of an n×n block of pixels. A choice of a particular identically positioned pixel in each of the n×n blocks results in a unique uniformly subsampled representation of the original image. For each particular pixel position within the 4×4 block, a different, but equally valid, reduced resolution representation of the higher resolution image is obtained.

The present invention provides an improved focusing method that takes advantage of the previously noted fact that subsampling by choosing 1 out of $n^2$ pixel positions as the representative pixel position allows $n^2$ different and useful uniformly sampled images to be created by subsampling. By sequentially displaying all, or some, of the $n^2$ subsampled images, the resulting dynamic display results in a periodic pattern of animated jaggies that displays more of the original pixel data. The periodic pattern corresponds to a closed cycle of displacement over a total displacement that is less that the interval between displayed samples. This dynamic display provides a live viewfinder display that makes focusing over the entire data field easier than focusing on a static single subsampled frame that is repetitively displayed. This results because the human eye is exquisitely sensitive to very small temporal changes in an image, so choosing different sampled pixel alignments has a much greater visual effect on aliased image components than on low spatial frequency components.

A variety of periodic patterns has been investigated for the purpose of determining which subsampling schemes produce the most effective periodic patterns for focusing. Because human vision has maximum sensitivity to flicker in the 3 to 5 Hertz (Hz) frequency region, and because image capture and display rates are in the range of 12 to 30 images per second, decimation factors ranging from 3 to 8 result in flicker intensified images in, or near, the preferred flicker rate range of 3 to 5 Hz.

Figure 3A:
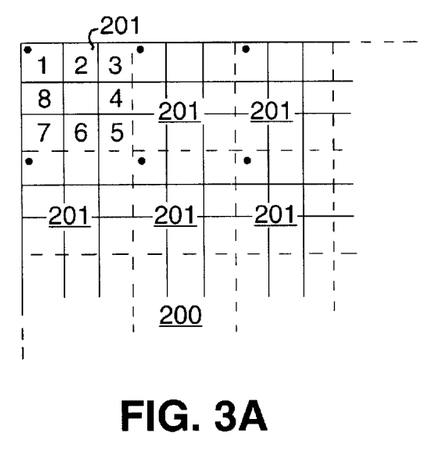
FIGS. 3(a) and 3(b) are examples of subsampling 1 out of 9 pixels selected from a 3×3 pixel block.
Figure 3B:
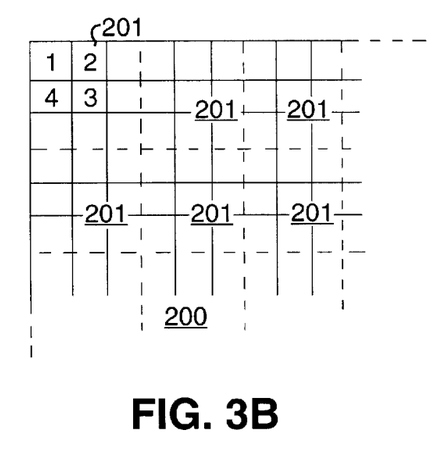
Figure 3C:
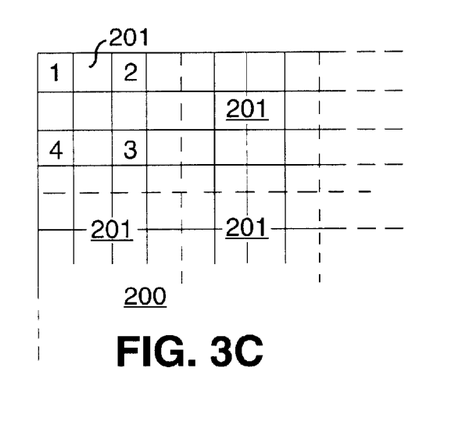
FIG. 3(c) shows an example of subsampling 1 out of 16 pixels selected from a 4×4 pixel block.

Preferred subsampling schemes result in the selection of pixels that are separated horizontally and vertically by the same prescribed distance so that the resulting change of scale in the horizontal and vertical directions is the same. FIGS. 3(a)–3(c) show examples of suitable subsampling schemes in which 1 out of 9 pixels is chosen from 3×3 pixel blocks 201 of FIGS. 3(a) and 3(b), and 1 out of 16 pixels is selected from 4×4 pixel block 201 in FIG. 3(c). In FIG. 3(a), the image is sampled sequentially, starting at pixel 1 of each 3×3 blocks 201 and then sequentially resampling, clockwise, each 3×3 block 201 of sequential image frames 200 for the remaining pixel positions 2–8. Because the sequence is periodic, the sequence repeats every 8 display frames. This causes the flicker rate to bed $\frac{1}{8}^{th}$ of the display frame rate (e.g. 1.5 to 3.75 Hz for frame rates of 12 to 30 frames per second). The sampling pattern of FIG. 3(b) sequences through four pixel positions (1–4) for each 3×3 block 201 in sequential frames 200 before repeating the sequence. This causes the flicker rate to be $1/4^{th}$ of the frame rate and typically results in flicker rates of 3 to 7.5 Hz. Similarly, the pattern shown in FIG. 3(c) samples 1 out of 16 pixels of each 4×4 block 201 for pixel positions 1–4 before repeating and thus produces a flicker rate equal to $1/4^{th}$ of the frame rate. The resulting flicker rate would typically be in the range of 3 to 7.5 Hz. The subsampling patterns that are preferred are periodic patterns of 4 or 8 different offsets generated in 3×3 or 4×4 pixel blocks, such that the offset moves in a 4 pixel small square pattern, or in an 8 pixel large square pattern. Although a clockwise subsampling sequence is used in FIGS. 3(a) through 3(b), it should be noted that a counter-clockwise sequence or any sequence through the selected pixel positions can be used to produce the desired animation of aliased image components.

Figure 4A:
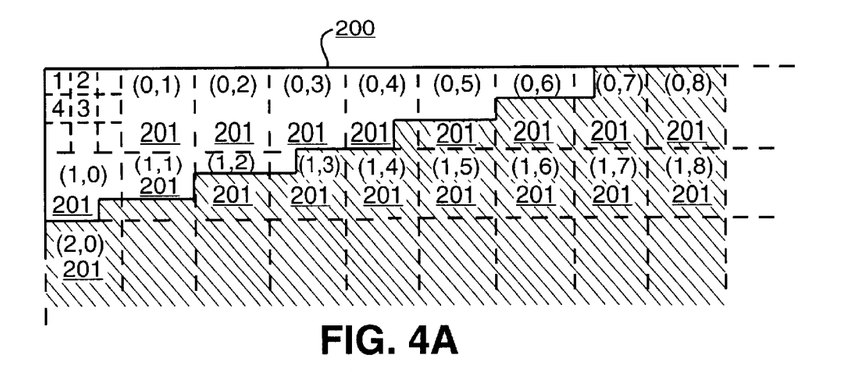
FIGS. 4(a)–4(g) show examples of periodic focusing images, produced by subsampling, as seen in a reduced resolution electronic viewfinder.
Figure 4B:
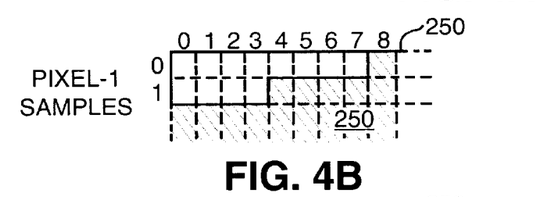
Figure 4C:
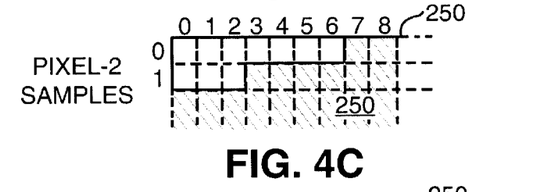
Figures 4D, 4E:
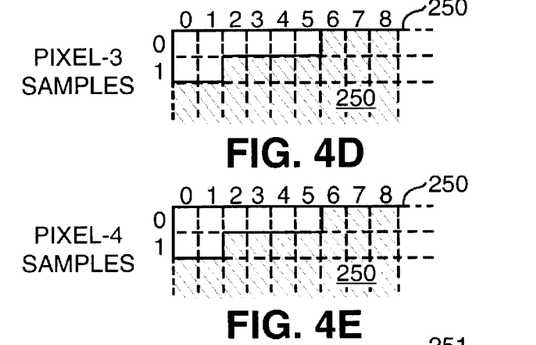
Figure 4F:
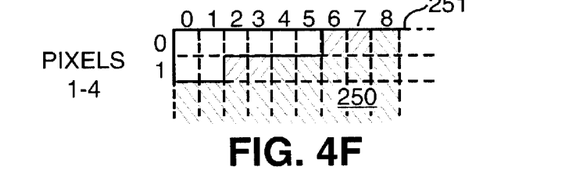
Figure 4G:
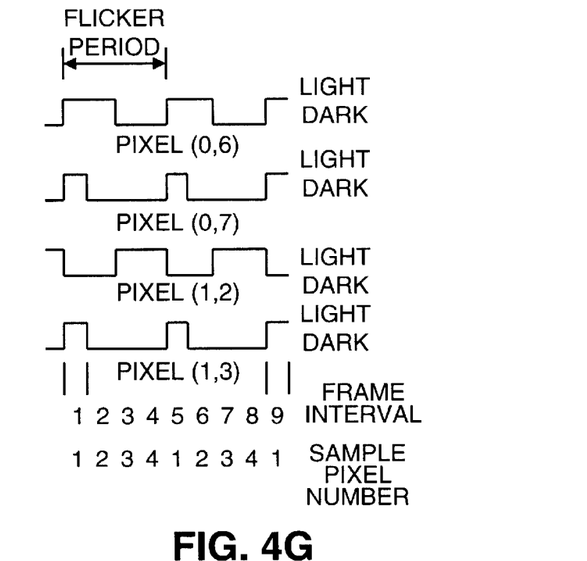

FIGS. 4(a)–4(g) illustrate an example of a periodic image sequence produced by subsampling and as displayed on an electronic viewfinder. In FIG. 4(a), a portion of an image frame 200 is shown. Each full resolution frame 200 is to be subsampled using 3×3 pixel blocks 201. Pixel positions within each pixel block 201 that are to be used for creating four subsampled images are labeled 1 through 4. The shaded pixels represent a sharp brightness edge in the discrete sampled image created by the photocell array of a digital camera. A row and column coordinate, (r, c) respectively identifies each pixel block. If one pixel position (of 1–4) is used in every pixel block 201 of FIG. 4(a) to produce a reduced resolution image 250, a different image, with a 3-to-1 scale reduction, is created for each of the four pixel positions. Thus, FIGS. 4(b) through 4(e) respectively show the subsampled images corresponding to sampling pixel positions 1 through 4. The indices for the rows and columns of FIGS. 4(b)–4(e) corresponds to the pixel block coordinates of FIG. 4(a) from which the subsampled pixels were taken. If all four subsampled images of FIGS. 4(b)–4(e) are sequentially displayed, the image in 4(f) would result and have a flicker rate of ¼ of the display frame rate. The relative jaggieness of the resulting image in FIGS. 4(f) is also increased because a discontinuity of one pixel in the scaled subsampled image corresponds to a 3 pixel discontinuity in the original image. The degree of shading in FIG. 4(f) indicates a variation in intensity due to the number of shaded pixels in the set of subsampled images that are superimposed. FIG. 4(g) shows the light-dark (or on-off) time history of selected pixels (0, 6), (0, 7), (1, 2), and (1, 3) as a function of both frame intervals and sample pixel number from which it can be seen that a flicker period of four frame intervals is created.

The important visual feature that distinguishes this inventive viewfinder image from that of the prior-art method of averaging of corresponding frames is the use of motion and flicker, which are readily apparent in image regions that are sharply focused.

The above descriptions were limited to specific examples for clarity of explanation of the invention. For example, subsampling, which was limited to scaling factors of 3-to-1 and 4-to-1 (or decimation factors of 9 and 16), may not be appropriate because specific differences between a digital camera resolution and the viewfinder resolution may require other scaling factors that can include non-integer reduction factors. However, the principles described above can be readily adapted to accommodate the general non-integer case.

Figure 5:
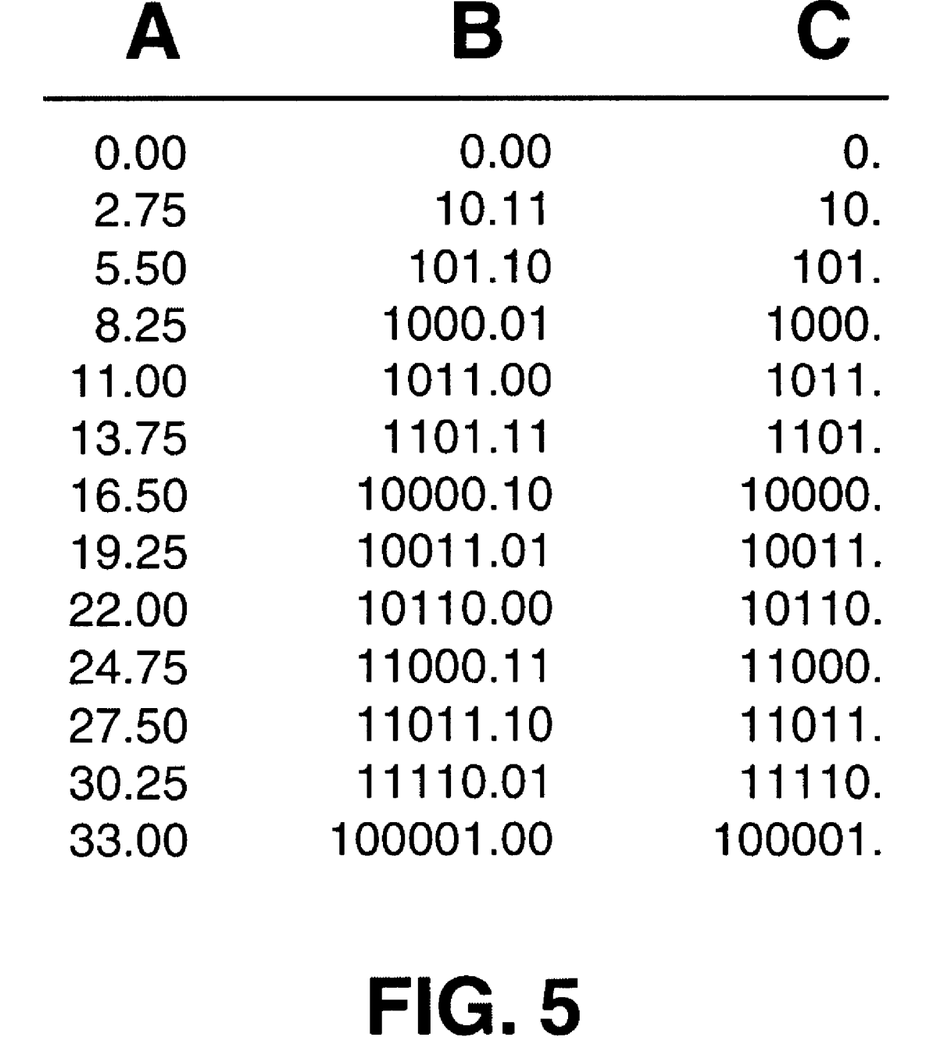
FIG. 5 is a table showing a method for computing the coordinates of non-integer pixel blocks.

For example, consider a non-integer resolution reduction factor of 2.75. Because fractional pixels do not exist in the full resolution image, the pixel array 200 of FIG. 4(a) can not be partitioned into 2.75×2.75 pixel blocks 210. FIG. 5 is a table that shows how the method is adapted for the non-integer case. Column A is a sequence of uniform horizontal and vertical pixel addresses (decimal) at which an edge of a pixel block would be located if fractional pixels could be used. Column B is the binary coded equivalent of column A. Column C is a truncated version of column B where the fractional part of the column B entries have been dropped so that an integer approximation of column B results. The average pixel block interval asymptotically approaches the desired non-integer interval as the size of the high-resolution image pixel array increases. Because of the substantially uniform subsampling interval, substantially uniform horizontal and vertical scaling of the image results.

Figure 6:
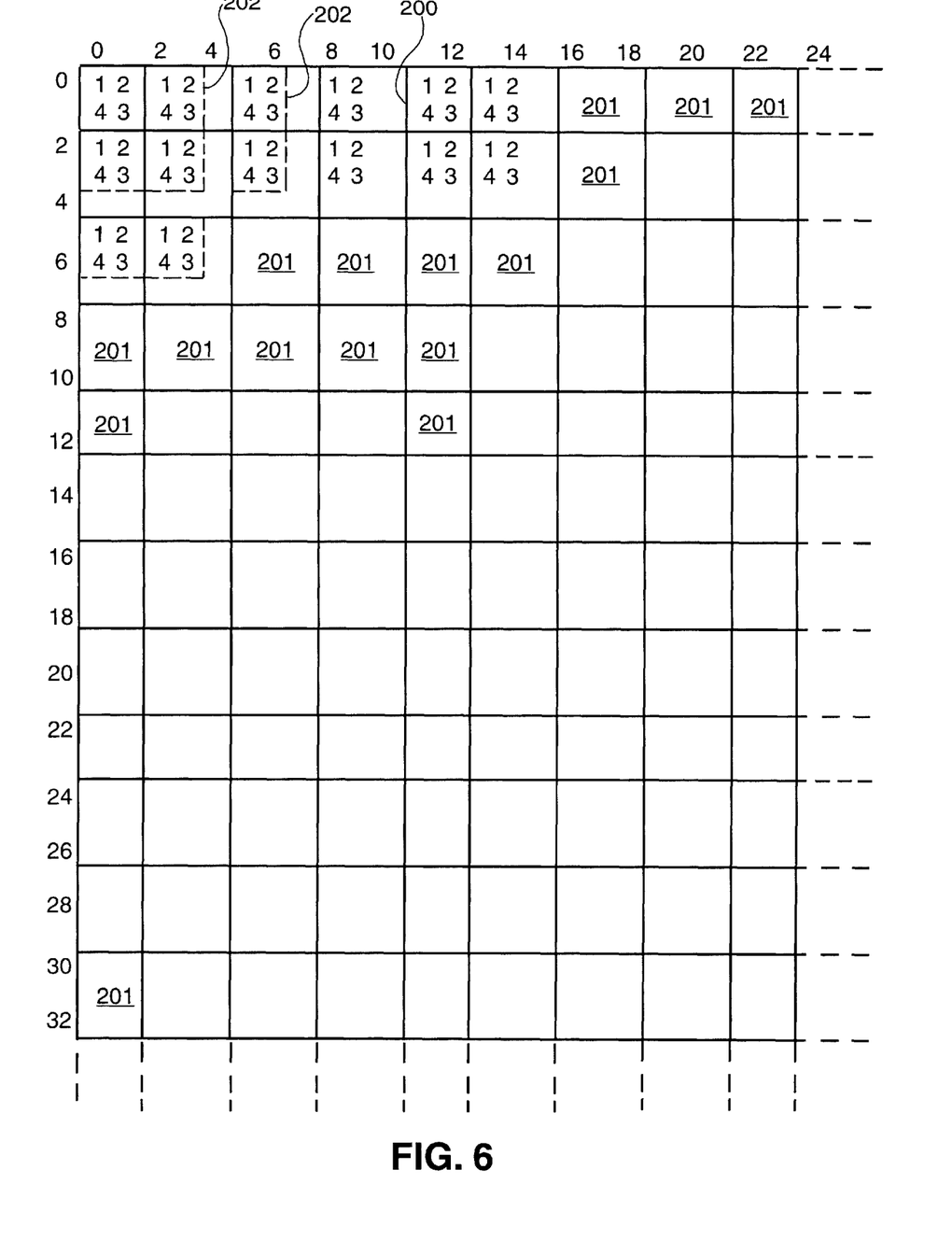
FIG. 6 shows the partitioning of an image into pixel blocks for non-integer resolution reduction.

FIG. 6 shows the results of using the values of FIG. 5, column C. The full resolution image array is shown partitioned into 3×3, 3×2, 2×3, and 2×2 pixel blocks 201 in proper proportion to produce a subsampled image with an average decimation factor of 2.75×2.75. (If the values of column B were rounded before truncation, the distribution of pixel block sizes for large size image arrays would have been the same. Hence, the preferred implementation does not include rounding before truncation.)

The location of the pixels to be displayed within each pixel block should preferably be chosen so that all pixel locations will fit within all pixel blocks, including the smallest (2×2 for the example of FIG. 6). As a result, a closed cycle of displacement over a total displacement that is less than the smallest interval between samples. The number of pixel locations selected for sequential display determines the flicker rate. For example, in FIG. 6, four unique pixel locations are indicated for each pixel block so that the flicker rate is one-fourth of the frame display rate if each subsampled image corresponding to a selected unique pixel location is displayed once during a flicker period. The flicker period can be increased either by increasing the number of unique pixel locations or by sampling one or more of the unique pixel locations more than once during a flicker period.

Dashed line boundaries 202 in FIG. 6 show that samples are still taken from equal-size square blocks, but that these blocks are no longer necessarily contiguous since they are sub-blocks of the unequal blocks 201.

Figure 7:
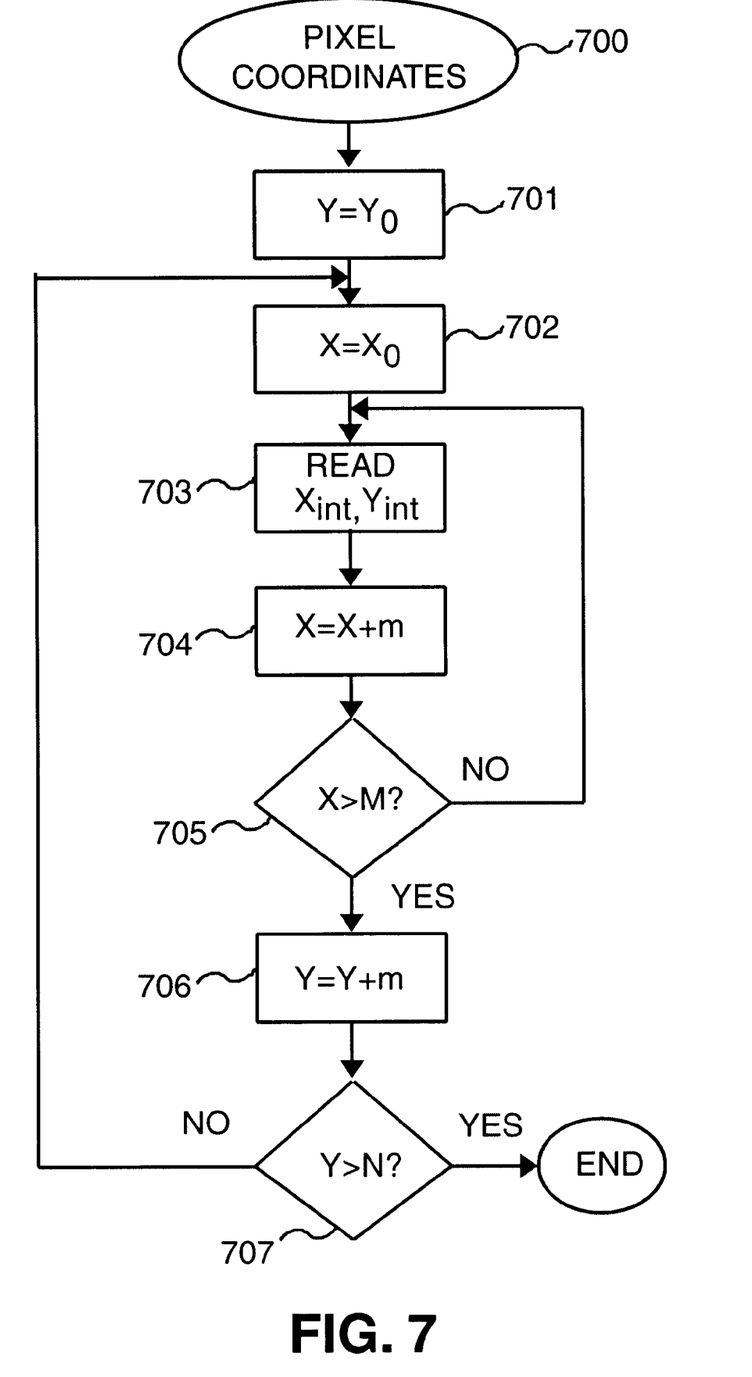
FIG. 7 is a flow diagram showing a method for computing pixel addresses for use in producing subsampled images.

FIG. 7 is the flow diagram of preferred method 700 for determining the coordinates (addresses) of the pixels that are required to achieve a given integer or non-integer resolution reduction factor, m. Step 701 sets initial sample coordinates $Y=Y_0$ . . . Step 702 sets $X=X_0$. In step 703, the pixel value at coordinates $X_{int}$, $Y_{int}$, where the subscript represents the floor function or integer part, is read from the high resolution image. In step 704, the next possibly non-integer horizontal address, is computed using its previous value and m. If, in step 705, it is determined that X does not exceed the horizontal pixel range, the process returns to step 703. Otherwise, step 706 is used to compute the next possibly non-integer row address, Y. If, in step 707, it is determined that Y is not greater than the row limit of the high-resolution limit, the process returns to step 703. Otherwise, the process ends and the subsampling is complete.

By repeating the process for a selected set of initial pixel locations ($X_0$, $Y_0$), method 700 can be used to generate a periodic sequence of reduced resolution images for display.

Figure 8:
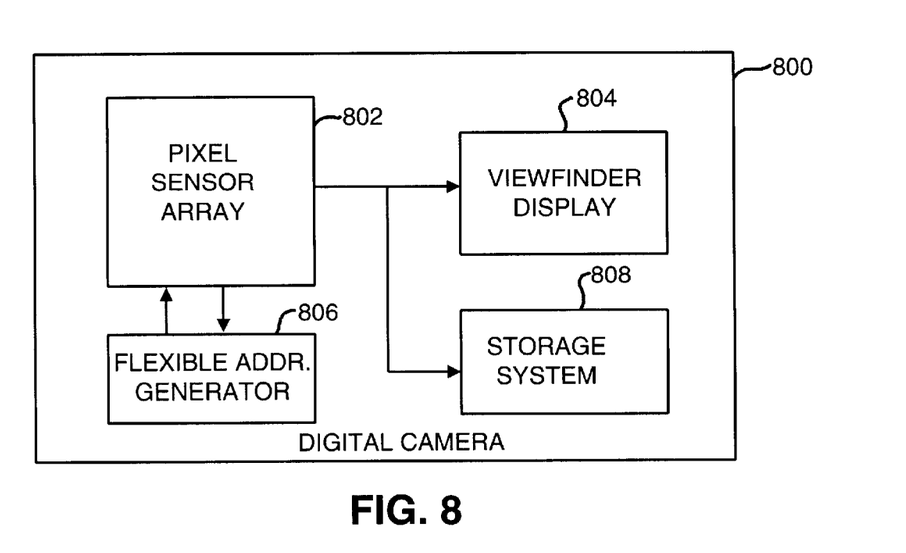
FIG. 8 is a block diagram of a digital camera employing scanning circuitry of the present invention.

FIG. 8 is a block diagram of a digital camera 800 employing scanning circuitry for subsampling high resolution pixel sensor array 802 for display on lower resolution viewfinder display 804 that may be used in accordance with the methods disclosed herein. The addresses and control signals, generated by flexible address generator 806, provides all of the signals necessary to control the reading of pixel data out of pixel sensor array 802. Flexible address generator 806 is used to read the high-resolution image out of pixel sensor array 802 for storage in storage system 808. Also, flexible address generator 806 is used to subsample the high-resolution image generated by pixel sensor array 802 for display on viewfinder display 804 so that the captured image can be adjusted and focused at the reduced resolution display of viewfinder 804.

Figure 9:
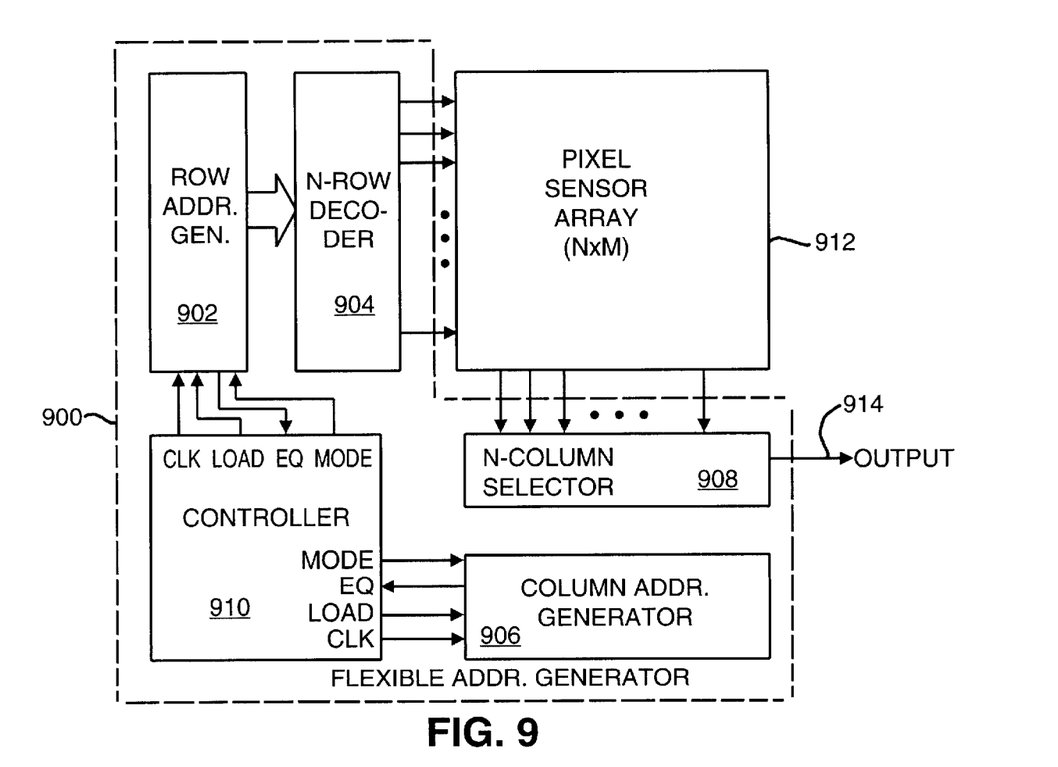
FIG. 9 is a block diagram of the main components of scanning circuitry for an active pixel sensor array of the present invention.

FIG. 9 is an illustrative block diagram showing in more detail the relationship between the flexible address generator and pixel sensor array of FIG. 8 with N rows and M columns. Flexible address generator 900 includes row address generator 902, row decoder 904, column address generator 906, column selector 908, and controller 910. Row address generator 902 and column address generator 906 are loadable counters under the control of controller 910. Controller 910 provides clock signals, counting interval (scale factor) in, and an initial offset address, $(X_0, Y_0)$, to row and column address generators 902 and 906, and receives status signals from row and column address generators 902 and 906. The readout of a subsampled image from pixel sensor array 912 begins with the loading of the initial offset coordinates, $(X_0, Y_0)$, as respective initial addresses to row address generator 902 and column address generator 906. The column address counter is then clocked to increment by m for producing the non-truncated coordinates, (X, Y) of which only the integer part bits are respectively supplied to row decoder 904 and column selector 908 for selecting the row and column of the pixel that is to be readout on output line 914 for display on viewfinder 804 of FIG. 8. When the last subsampled pixel of a given row is read out, the column address generator activates line EQ to indicate that the row has been subsampled. The counter of row address generator 902 is incremented by m for producing a next Y value, and the column address generator 906 is reset to $X_0$. The previously described operation for reading the selected columns is repeated. When the last row and column is readout, a scan-complete signal (EQ) is sent to controller 910 by row and column address generators 902 and 906. The controller produces a new subsampled image display by initializing the process with a new set of prescribed initial coordinate offsets.

A more detailed description of the circuitry shown in and described with reference to FIGS. 8 and 9 may be found in co-pending application Ser. No. 09/120,491, filed Jul. 21, 1998. This co-pending application is expressly incorporated herein by reference.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A dynamic focusing method for a high-resolution digital camera having an adjustable focusing mechanism and a reduced-resolution electronic viewfinder display, the focusing method comprising:

(a) dividing a high-resolution image generated by a high-resolution image sensor into a plurality of blocks of pixels, each block having a plurality of pixels, selecting one pixel from a pixel position within each block, and displaying a reduced-resolution image, with substantially uniform vertical and horizontal scaling, obtained from the selected pixel within each block for at least one display frame on the reduced-resolution viewfinder display;

(b) repeating (a) for a prescribed number of times using a different pixel position each time, the prescribed number of times being fewer than the number of pixels in at least one block of pixels; and (c) repeating (b) to produce a periodic sequence of reduced-resolution images.

2. The method of claim 1 wherein (a) comprises dividing the high-resolution into a set of equal-size square blocks of pixels.

3. The method of claim 2 wherein the square blocks are 3 pixels by 3 pixels.

4. The method of claim 2 wherein the square blocks are 4 pixels by 4 pixels.

5. The method of claim 1 wherein the using a different pixel position each time is by sequentially selecting a different pixel from one of four pixel positions arranged as corners of a square.

6. The method of claim 1 wherein the using a different pixel position each time is by sequentially selecting a different pixel from one of eight pixel positions forming the perimeter of a square.

7. The method of claim 1 further comprising determining the prescribed number of times by selecting a number that results in a desired flicker rate.

8. The method of claim 7 wherein the desired flicker rate is approximately in the range of 3 to 5 cycles per second.

9. The method of claim 1 further comprising adjusting the focusing mechanism to produce a desired focusing result while watching the periodic sequence of reduced-resolution images on the reduced-resolution electronic viewfinder display.

10. A digital electronic camera with a live viewfinder to aid in focusing, the digital electronic camera comprising:

a pixel sensor array having a plurality of pixel positions for sensing a sequence of images;

a row and column address generator for subsampling the pixel sensor array, at pixel positions with substantially uniform intervals, for each image in the sequence of images, said row and column address generator configured to use a periodic cycle of row and column start addresses for subsampling successive images of the sequence of images, thereby generating a sequence of reduced resolution images consisting of data from addressed pixel positions, wherein the number of addressed pixel positions of all images in the sequence of reduced resolution images are fewer than the number of pixel positions in the plurality of pixel positions; and an electronic display for displaying the sequence of images as the sequence of reduced resolution images.

11. The digital electronic camera of claim 10 wherein the row and column address generator selects a different set of pixels for at least one reduced resolution image in the sequence of reduced resolution images.

12. The digital electronic camera of claim 11 wherein the row and column address generator repeats the sequence of reduced resolution images for producing a periodic sequence of reduced resolution images as an aid to focusing.

13. The digital electronic camera of claim 12 wherein the row and column address generator selects a different set of pixels, for at least one reduced resolution image, in the sequence of reduced resolution images used for producing a periodic pattern that corresponds to a closed cycle of displacement over a total displacement that is less than the smallest interval between subsamples.

14. The digital electronic camera of claim 13 wherein the periodic pattern is a cycle of four shifts of equal magnitude that forms a square closed cycle of displacement.

15. The digital electronic camera of claim 13 wherein the periodic pattern is a cycle of eight shifts of equal magnitude that forms a square closed cycle of displacement.

* * * * *